Figure 1:
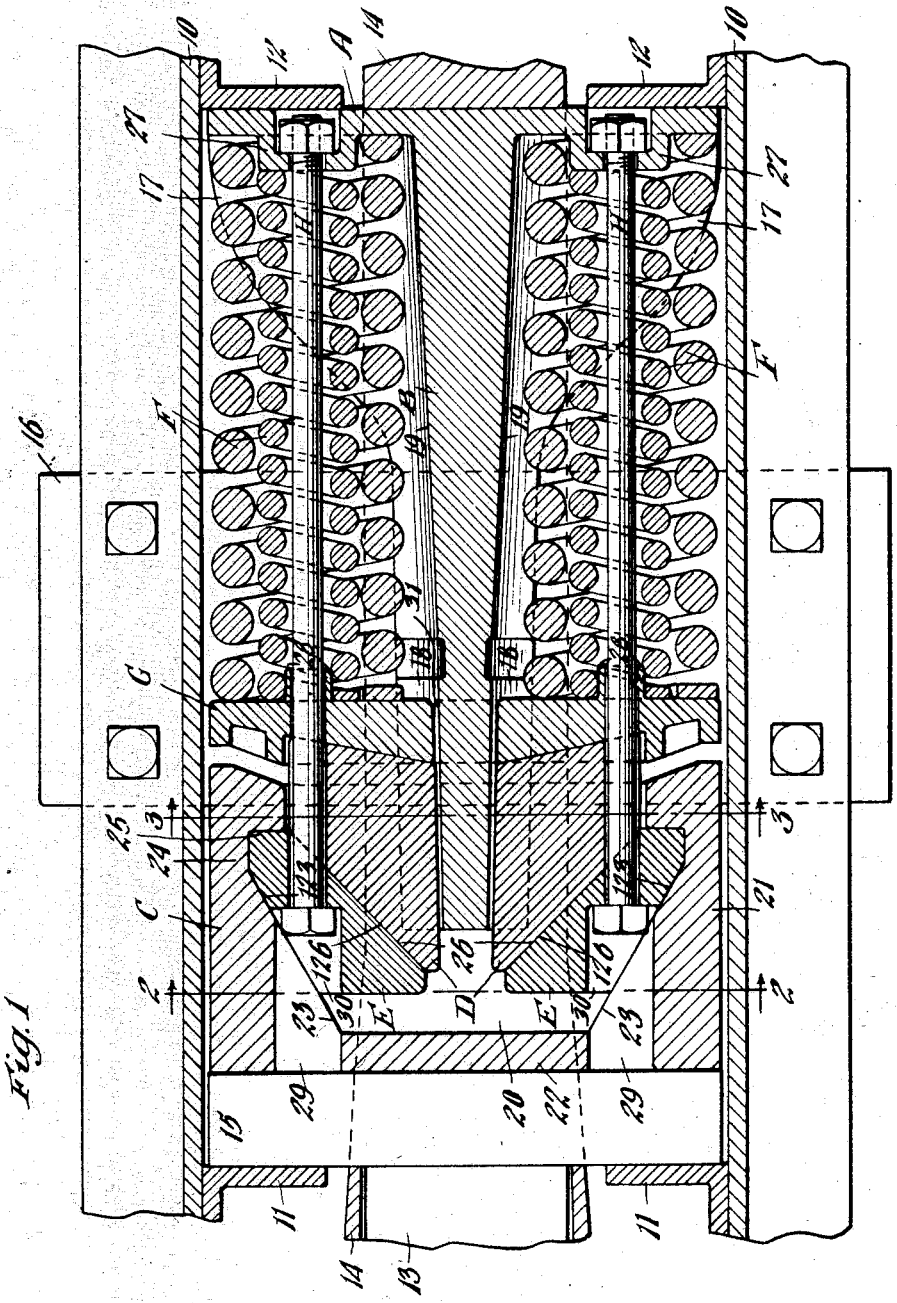

Dec. 25, 1928.                                                                    1,696,319
J. F. O'CONNOR
FRICTION SHOCK ABSORBING MECHANISM
Original Filed March 16, 1925    2 Sheets-Sheet 1

Witness
Wm. Geiger

Inventor
John F. O'Connor
By George I. Haight
His Atty.

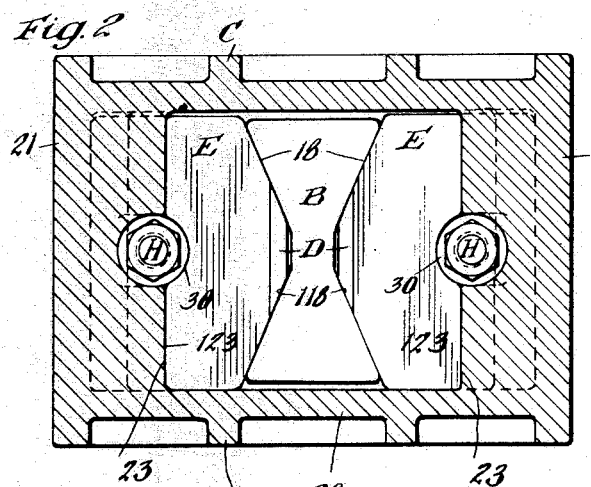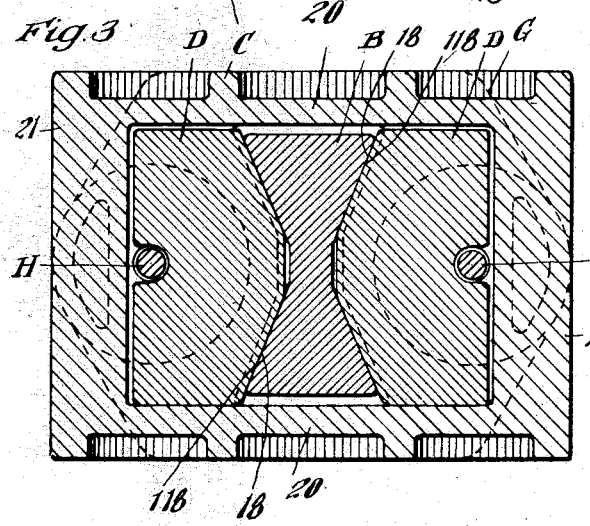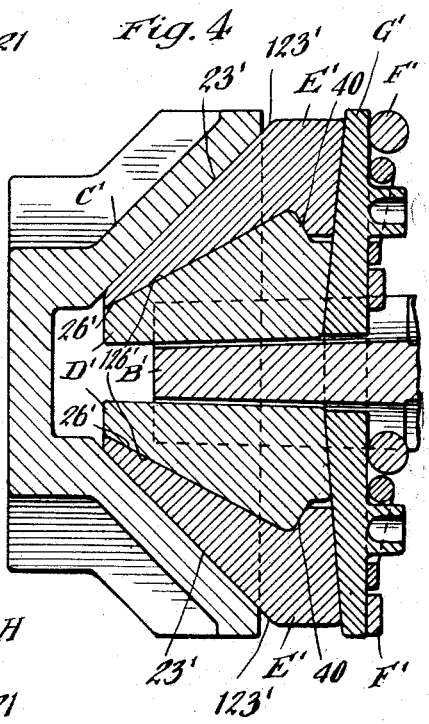

Patented Dec. 25, 1928.

1,696,319

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed March 16, 1925, Serial No. 15,738. Renewed June 6, 1928.

This invention relates to improvements in friction shock-absorbing mechanisms.

One object of the invention is to provide a friction shock absorbing mechanism, especially adapted for railway draft riggings, having high frictional resistance and certain release.

Another object of the invention is to provide a mechanism of the character indicated, wherein are provided elements having keen and blunt wedging angles so arranged as to effect a differential action during the compression stroke.

Other and further objects of the invention will more fully and clearly appear from the description and claims hereinafter following.

In the drawings forming a part of this specification, Figure 1 is a horizontal, longitudinal, sectional view of a portion of a railway draft rigging, showing my improvements in connection therewith. Figures 2 and 3 are vertical, transverse, sectional views corresponding respectively to the lines 2—2 and 3—3 of Figure 1. And Figure 4 is a view similar to Figure 1 of the front end only of the shock absorbing mechanism proper, illustrating a different embodiment of the invention.

In said drawings, referring first to the embodiment illustrated in Figures 1, 2 and 3, 10—10 indicate channel-shaped center or draft sills of a railway car underframe, to the inner faces of which are secured front stop lugs 11—11 and rear stop lugs 12—12. The inner end portion of the drawbar is indicated by 13, to which is operatively connected a hooded yoke 14 of well-known form. The shock absorbing mechanism proper, as well as a front main follower 15, are arranged within the yoke. A detachable saddle plate 16 supports the yoke and the mechanism therewithin in operative position.

The friction shock absorbing mechanism proper, as shown, comprises broadly, a rear follower element A, having a friction post B formed integral therewith; a front wedge casing C; a pair of wedge friction shoes D—D; a pair of auxiliary wedge elements E—E; twin arranged main spring resistance elements F; a spring follower G; and a pair of retainer bolts H—H.

The rear follower A is in the form of a rectangular plate having the friction post B extending forwardly therefrom and arranged centrally thereof. The follower A cooperates with the rear stop lugs in the usual manner. Top and bottom strengthening webs 17—17 reinforce the post and follower member. The friction post B has a pair of friction surfaces 18—18 on the opposite sides thereof, each friction surface 18 being of generally V-shape. As clearly shown in Figure 1, the friction surfaces 18 are arranged at the forward end of the post and diverge slightly inwardly of the mechanism. Between the friction surfaces and the rear end of the post, the opposite sides are cut away as indicated at 19—19 to accommodate the inner sides of the springs, which are arranged on opposite sides of the post.

The wedge casing C is of generally rectangular form having horizontally disposed top and bottom walls 20—20, vertically disposed side walls 21—21 and a transverse outer end wall 22. The end wall 22 bears directly on the inner surface of the front follower 15. The side walls 21 are provided on the inner sides thereof with opposed, rearwardly diverging wedge faces 23, the faces 23 being disposed at a relatively keen angle with reference to the longitudinal axis of the mechanism. The faces 23 terminate short of the inner ends of the side walls of the casing as most clearly shown in Figure 1, each side wall of the casing being provided with a short flat face 24 at the inner end of the corresponding wedge face, the opposed faces 24 being parallel to each other. Inwardly of the faces 24, the side walls of the casing are provided with transverse, flat abutment faces 25 for a purpose hereinafter described.

The two wedge friction shoes D are of like construction, each shoe being formed on the inner side with a friction surface 118 corresponding in contour to the friction surface 18 at one side of the post. On the outer side, each shoe is provided with a wedge face 26 disposed at a relatively blunt angle with reference to the longitudinal axis of the mechanism. The inner end of each shoe is beveled laterally, as shown, and bears directly on the front surface of the spring follower G which is similarly beveled.

The two auxiliary wedge elements E—E are of like construction, each being provided on the inner side with a blunt wedge face 126 adapted to cooperate with the corresponding wedge face 26 of one of the shoes D and an outer keen wedge face 123 adapted to cooperate with the corresponding wedge face 23 of the casing C.

The spring resistance elements F are twin arranged, being disposed at opposite sides of the post B and have their front ends bearing on the spring follower G. Each member of the twin arranged springs comprises a relatively heavy outer coil and a relatively light inner coil, the outer coil having its rear end bearing on the follower casing A and the inner coil having its rear end bearing on a hollow boss 27 on the follower A. It will be evident that two bosses 27 are provided, one for each member of the spring, the bosses being arranged on opposite sides of the mechanism. The front ends of the inner coils of the spring resistance elements are centered by a pair of rearwardly extending bosses 28 on the spring follower G.

The mechanism is held of uniform overall length and under initial compression by the two retainer bolts H, the same being disposed on opposite sides of the mechanism. Each bolt has the opposite ends thereof anchored to the follower A and the auxiliary wedge element E at the corresponding side of the mechanism. The front follower casing is provided with openings 29—29 at the opposite sides thereof to permit insertion of the retainer bolts H, the heads of the bolts being accommodated in recesses 30 in the corresponding auxiliary wedge elements. The nuts at the rear ends of the bolts are accommodated within the hollow bosses of the rear follower A, and the shanks of the bolts extend through alined openings in the wedge shoes and follower G.

As clearly shown in Figure 1, the follower G is provided with a central opening 31 adapted to slidingly accommodate the friction post B, the opening being of such a size that it will freely accommodate the post when the follower G is in its innermost position when the mechanism is fully compressed.

When the parts are in the full release position, as clearly shown in Figure 1, the front end of the post and the front ends of the auxiliary wedge elements are spaced from the inner surface of the end wall 22 of the follower wedge casing C, the post being spaced a greater distance therefrom than the auxiliary wedge elements. The distance between the outer end of the post and the inner surface of the end wall of the wedge casing is preferably equal to the full compression stroke of the mechanism, so that inward movement of the wedge casing will be positively limited and the actuating force transmitted directly to the post. It will also be seen that the outer sides of the friction shoes are normally spaced a slight distance from the corresponding inner surface of the side walls of the casing, thus providing clearance for lateral movement of the friction wedge shoes, due to the taper of the friction post. In full release of the mechanism, relative movement of the auxiliary wedge elements with reference to the wedge casing is positively limited by the abutment shoulders 25 which then are in engagement with the inner ends of said elements.

The operation of my improved shock absorbing mechanism is as follows, assuming an inward or compression movement of the drawbar. As the pressure is transmitted to the front follower 15, the latter carries the wedge casing inwardly therewith, a wedging action being thus set up between the latter, the auxiliary wedge elements and the friction wedge shoes, the latter being forced into intimate contact with the friction surfaces of the post B, by slippage on keen wedge faces 23 and 123. During the further inward movement of the front follower and wedge casing C, the shoes D will be forced to slide inwardly on the friction surfaces of the post and due to the diverging relation of the friction faces will be spread laterally apart, slipping on the wedge faces 126 of the auxiliary wedge elements E. A differential action will thus be effected, causing the spring follower G to move inwardly more rapidly than the wedge casing C and effecting an additional compression of the springs F. This action will continue either until the actuating pressure is reduced or until the wall 22 of the casing C comes into abutment with the outer end of the friction post B, whereupon the pressure will be transmitted directly to the post as hereinbefore pointed out. During release, the main springs will effectively restore all of the parts to normal position, forward movement of the auxiliary wedge elements being positively limited by the retainer bolts H and outward movement by stops 25. By providing the auxiliary wedge elements and shoes with blunt faces, release is greatly facilitated.

Due to the employment of the blunt and keen set of wedge faces, I am enabled to obtain a very high wedging action during the compression stroke, since the keen angle wedge faces may be made relatively acute without danger of the parts sticking, and the blunt wedge faces acting more or less as "safety valves" to prevent sticking.

The embodiment of the invention as illustrated in Figure 4, includes a friction post B', a wedge casing C', two friction shoes D'—D', and two auxiliary wedge elements E'—E', similar to the corresponding elements B, C, D and E of the embodiment of the invention hereinbefore described, with the exception that the friction shoes D' are provided with relatively keen wedge faces 26' co-operating with correspondingly keen wedge faces 126' on the inner sides of the auxiliary wedge elements and that the auxiliary wedge elements E' are provided with outer, relatively blunt wedge faces 123' cooperating with correspondingly blunt wedge faces 23' on the interior of the wedge casing C'. In Figure 4, the auxiliary wedge elements and friction shoes are also shown as provided with co-operating shoulders 40 for limiting outward movement of the auxiliary elements with reference to the shoes when the mechanism is in full release. The spring follower is indicated by G' and co-operates with twin arranged main spring resistance elements F'—F'. Another distinction is that both the auxiliary wedge elements and the friction wedge shoes bear on the spring follower G'. The operation of the embodiment of the invention illustrated in Figure 4, is substantially the same as that hereinbefore described, differing only in that the differential action takes place between the wedge faces of the casing C' and auxiliary wedge elements E'.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a follower acting element having a friction post thereon, said post having inwardly diverging friction surfaces; main spring resistance elements; opposed friction shoes cooperable with the friction surfaces of the post, said shoes having relatively blunt angle wedge faces; a pressure transmitting, relatively keen angled wedge element; and differential blocks between said wedge element and shoes and cooperable with the respective wedge faces thereof.

2. In a friction shock absorbing mechanism, the combination with follower acting elements relatively movable toward each other, one of said elements having a friction post thereon, said post having inclined friction surfaces; of a spring resistance; friction shoes cooperating with the friction surfaces of the post, said shoes having relatively blunt angled outer wedge faces; keen angle wedge means associated with the other follower element; and auxiliary wedge elements between said wedge means and shoes and cooperable with the respective wedge faces thereof.

3. In a friction shock absorbing mechanism, the combination with a column element having rearwardly diverging friction surfaces thereon; of a plurality of friction shoes co-operating with the friction surfaces of said column element, each of said shoes having a wedge face; pressure transmitting means provided with wedge faces; a plurality of wedge blocks between said wedge means and shoes and corresponding in number to the latter, each of said wedge blocks having a pair of wedge faces co-operating respectively with the wedge faces of one of said shoes and one of the wedge faces of said pressure transmitting means, one of said wedge faces of each pair being disposed at a relatively keen wedge acting angle and the other at a relatively blunt releasing angle with respect to the longitudinal axis of the mechanism; and twin arranged main spring resistance elements disposed on opposite sides of the column element.

4. In a friction shock absorbing mechanism, the combination with a main follower element having a friction member associated therewith, said member having longitudinally disposed friction surfaces; of friction shoes cooperating with the friction surfaces of said member; spring means interposed between the shoes and follower element; wedges cooperating with the shoes; means for anchoring the wedges to said follower; a pressure transmitting element cooperating with said wedges, said pressure transmitting element and follower being relatively movable to each other; co-operating anchoring means on said wedges and pressure transmitting element for limiting the relative movement of said follower element and pressure transmitting element to maintain the gear of overall, uniform length in release, and holding the parts assembled.

In witness that I claim the foregoing I have hereunto subscribed my name this 12th day of March, 1925.

JOHN F. O'CONNOR.